US005973544A

United States Patent [19]

Ohno

[11] Patent Number: 5,973,544

[45] Date of Patent: Oct. 26, 1999

[54] INTERMEDIATE POTENTIAL GENERATION CIRCUIT

[75] Inventor: Tsuyoshi Ohno, Kanagawa, Japan

[73] Assignee: NEC Corporation, Tokyo, Japan

[21] Appl. No.: 09/121,118

[22] Filed: Jul. 23, 1998

[30] Foreign Application Priority Data

Jul. 24, 1997 [JP] Japan .................................... 9-198165

[51] Int. Cl.[6] ........................................................ H02J 3/38

[52] U.S. Cl. .......................... 327/530; 325/538; 325/543; 323/313

[58] Field of Search .................................... 327/530, 537, 327/538, 540, 541, 542, 543; 323/313, 314

[56] References Cited

U.S. PATENT DOCUMENTS

| | | | |
|---|---|---|---|
| 5,369,354 | 11/1994 | Mori | 323/313 |
| 5,451,896 | 9/1995 | Mori | 327/543 |
| 5,592,119 | 1/1997 | Yoo | 327/530 |
| 5,703,475 | 12/1997 | Lee et al. | 323/313 |
| 5,717,324 | 2/1998 | Tobita | 323/313 |
| 5,757,225 | 5/1998 | Tobita | 327/539 |

FOREIGN PATENT DOCUMENTS

| | | |
|---|---|---|
| 0 205 104 | 12/1986 | European Pat. Off. . |
| 0 276 572 | 8/1988 | European Pat. Off. . |
| 0 321 226 | 6/1989 | European Pat. Off. . |
| 63-12010 | 1/1988 | Japan . |

*Primary Examiner*—Timothy P. Callahan
*Assistant Examiner*—An T. Luu
*Attorney, Agent, or Firm*—Sughrue, Mion, Zinn, Macpeak & Seas, PLLC

[57] ABSTRACT

An intermediate potential generating circuit mainly includes an intermediate potential generating portion and an output portion. In this event, the intermediate potential generating portion generates first and second signals having first and second intermediate potentials different from each other between a first voltage source and a second voltage source and supplies the first and second signals via first and second signal terminals. Specifically, the intermediate potential generating portion has first, second, third and fourth MOS transistors. On the other hand, the output portion supplies a power supply having a third intermediate potential between the first intermediate potential and the second intermediate potential via an output terminal and is formed by fifth and sixth MOS transistors.

17 Claims, 8 Drawing Sheets

INTERMEDIATE POTENTIAL GENERATION CIRCUIT

BACKGROUND OF THE INVENTION

This invention relates to an intermediate potential generation circuit for generating an intermediate potential between power source voltages, and in particular, the intermediate potential generation circuit which is formed in a semiconductor integrated circuit and which generates a power supply having the intermediate potential from an applied power supply voltage.

For instance, disclosure has been made about an intermediate potential generation circuit in Japanese Unexamined Patent Publication No. Sho. 63-12010 (namely, 12010/1988, thereinafter, referred to as a conventional reference). In such an intermediate potential generation circuit, it is required as a basic function to generate a constant voltage irrespective of a large current.

Specifically, the above-mentioned intermediate potential generation circuit is generally composed of an intermediate potential generation portion and an output portion.

Specifically, a first resistor, an N-channel MOS transistor, a P-channel MOS transistor and a second resistor are serially connected in this order between power sources VDD and VSS in the above intermediate potential generation portion. On the other hand, both an N-channel MOS transistor and a P-channel MOS transistor are connected in series between the power sources VDD and VSS in the output portion.

As mentioned before, the first and second resistors are serially connected to the MOS transistor. In consequence, a response time for potential variation largely depends upon a load device, such as the resistors, in which the resistance value is invariable. Therefore, it is necessary to reduce the resistance value of the resistor in order to improve resistance to a noise and reduce an affect due to the noise.

However, consumption current inevitably becomes large in this case. Thus, there is a trade-off relationship between improvement of resistance to the noise and a low consumption current in the above conventional intermediate potential generation circuit.

Further, it is necessary to connect a plurality of MOS transistors having a low resistance in series in a gate array. This is because it is difficult to arrange a load device having a high resistance in the above gate array.

Consequently, the layout area is inevitably increased to arrange a plurality of MOS transistors in the semiconductor integrated circuit.

SUMMARY OF THE INVENTION

It is therefore an object of this invention to provide an intermediate potential generation circuit which is capable of supplying a constant voltage irrespective of a large output current.

It is another object of this invention to provide an intermediate potential generation circuit which is capable of obtaining a large drive capability with a low consumption current.

It is still another object of this invention to provide an intermediate potential generation circuit which is capable of reducing a layout area and which is superior in resistance to a noise.

An intermediate potential generating circuit according to this invention mainly includes an intermediate potential generating portion and an output portion.

In this event, the intermediate potential generating portion generates first and second signals having first and second intermediate potentials different to each other between a first voltage source and a second voltage source and supplies the first and second signals via first and second signal terminals.

Under this circumstance, the intermediate potential generating portion has first, second, third and fourth MOS transistors.

Specifically, the first MOS transistor is connected between said first and second voltage sources and has a first gate and a first drain. Herein, the first gate is connected to the first drain.

Further, the second and third MOS transistors are connected in series between the first signal terminal and the second signal terminal and have conductive types different to each other.

Moreover, the fourth MOS transistor is connected between the first and second voltage sources and has a second gate and a second drain. Herein, the second gate is connected to the second drain;

On the other hand, the above output portion supplies a power supply having a third intermediate potential between the first intermediate potential and the second intermediate potential via an output terminal.

In this event, the output portion has fifth and sixth MOS transistors. More specifically, the fifth MOS transistor has a third drain, a third source and a third gate. Herein, the third drain is connected to the first power source, the third source is coupled to the output terminal and the third gate is coupled to the first signal terminal.

Further, the sixth MOS transistor has a fourth drain, a fourth source and a fourth gate. Herein, the fourth drain is connected to the second power source, the fourth source is coupled to the output terminal and the fourth gate is coupled to the second terminal.

In accordance with this invention, the intermediate potential generation circuit has a large current drive capability and is capable of supplying a constant voltage irrespective of a large output current.

Further, a large current drive capability can be obtained with a low consumption current in the intermediate potential generation circuit. Moreover, resistance to the noise is superior, and further, the layout area can be largely reduced in the intermediate potential generation circuit.

DESCRIPTION OF THE PREFERRED EMBODIMENT

Figure 1:
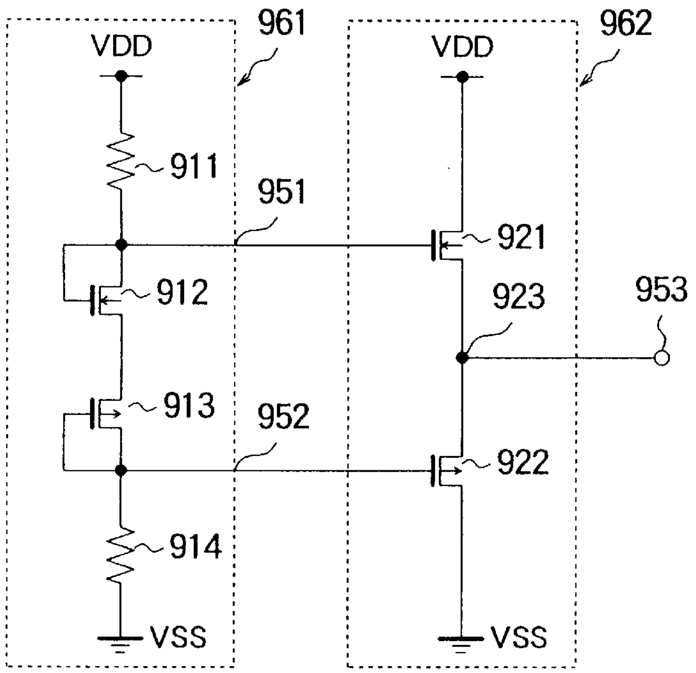
FIG. 1 PRIOR ART
FIG. 1 is a circuit diagram showing a conventional intermediate potential generation circuit.

Referring to FIG. 1, a conventional intermediate potential generation circuit will be first described for a better understanding of this invention. The intermediate potential generation circuit is equivalent to the conventional intimidate potential generation circuit mentioned in the preamble of the instant specification.

As illustrated in FIG. 1, an intermediate potential generation circuit includes an intermediate potential generation portion 961 and an output portion 962. In such an intermediate potential generation portion 961, a resistor 911, an N-channel MOS transistor 912, a P-channel MOS transistor 913 and a resistor 914 are connected in series between power sources VDD and VSS. In this event, a gate of the N-channel MOS transistor 912 is coupled to a connection point 951 while a gate of the P-channel MOS transistor 913 is coupled to a connection point 952.

On the other hand, an N-channel MOS transistor 921 and a P-channel MOS transistor 922 are connected in series between the power sources VDD and VSS in the output portion 962. Herein, a gate of the N-channel MOS transistor 921 is connected to the connection point 951 while a gate of the P-channel MOS transistor 922 is connected to the connection point 952. With this structure, an output terminal 953 is coupled to a connection point between the N-channel MOS transistor 921 and the P-channel MOS transistor 922.

Herein, it is assumed that the MOS transistor 912 has a threshold voltage Vtn1 while the MOS transistor 913 has the threshold voltage Vtp1. Likewise, the MOS transistor 921 has the threshold voltage Vtn2 while the MOS transistor 922 has a threshold voltage Vtp2.

Under the circumstances, the relationship between the respective threshold voltages is represented by the following equations:

$$Vtn1<Vtn2,\ |Vtp1|<|Vtp2|.$$

Figure 2:
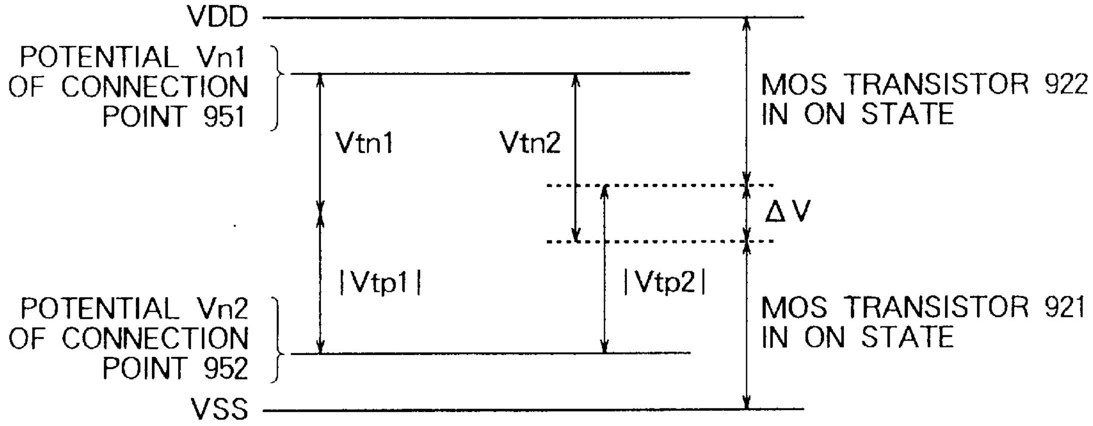
FIG. 2 PRIOR ART
FIG. 2 is a diagram for explaining an operation of the intermediate potential generation circuit illustrated in FIG. 1.

As illustrated in FIG. 2, two kinds of intermediate potentials Vn1 and Vn2 each of which has a low drive capability are generated at the connection points 951 and 952, respectively. In this case, the intermediate potentials Vn1 and Vn2 are given by the use of the resistors 911,914 and the MOS transistors 912, 913.

Herein, when the resistance values of the resistors 911 and 914 are identical to each other, the potential of the connection point between the MOS transistors 912 and 913 is put into the intermediate potential between source voltages of the power sources which will also be represented by VDD and VSS. In this case, when VSS is equal to 0 [V], the intermediate potential becomes VDD/2 [V].

In this condition, the potential Vn1 of the connection point 951 is raised in dependency upon the threshold voltage Vtn1 of the MOS transistor 912 from VDD/2 while the potential Vn2 of the connection point 952 is lowered relying on the absolute value of the threshold voltage Vtp1 of the MOS transistor 913 from VDD/2.

Under this condition, the N-channel MOS transistor 921 and the P-channel MOS transistor 922 each of which has a large drive capability are controlled so as to be turned on by the use of these two kinds of intermediate potentials Vn1 and Vn2.

In this event, each of the MOS transistors 912 and 913 has a high on-resistance because it operates near the threshold voltage. Under this circumstance, when the potential Vn1 of the connection point 951 or the potential Vn2 of the connection point 952 is fluctuated, the charge/discharge is caused to occur through the resistors 911,914 and the MOS transistors 912,913 so as to suppress the fluctuation.

In this event, when the potential of the output terminal 953 is higher than the value which is given by summing up the threshold value of the MOS transistor 922 at the potential Vn2 of the connection point 952 during the potential variation of the output terminal 953, the MOS transistor 922 is turned on and operates so that the output potential becomes low. In this case, the N-channel MOS transistor 921 is turned off.

On the other hand, when the potential of the output terminal 953 is lower than the value which is given by subtracting the threshold value voltage Vtn2 of the MOS transistor 921 from the potential Vn1 of the connection point 951, the MOS transistor 921 is turned on and operates so that the output potential becomes high. In this event, the P-channel MOS transistor 921 is turned off. Thus, the output potential of the output terminal 953 is selected at the intermediate potential between the power sources VDD and VSS by repeating these operations.

In the meanwhile, it is to be noted that disclosure has been made about the intermediate potential generation circuit in which the P-channel MOS transistor or the N-channel MOS transistor in the on-state is used instead of the resistors 911 and 914 in the above-mentioned conventional reference. In such an intermediate potential generation circuit, the same effect as the intermediate potential generation circuit illustrated in FIG. 1 can be obtained by controlling the threshold voltage of the MOS transistor by the use of various techniques.

The above-mentioned technique includes a method in which the threshold voltage is variable by changing a channel length of the MOS transistor, a method in which the threshold voltage is variable by changing an impurity concentration or a method in which the threshold voltage is variable by coupling a well of a back gate to the intimidate potential different from the other well by the use of the back bias effect.

Herein, description will be made about a problem with respect to the intermediate potential generation circuit illustrated in FIG. 1, referring FIG. 1 together with to FIG. 3.

For instance, it is assumed that the other signal (namely, noise) which operates at a high speed is given from a signal input source 934 and transmits to the connection points 951 and 952 via parasitic capacitors 932 and 933. In this event, each of MOS transistors 912 and 913 illustrated in FIG. 1 is caused to reduce the on-resistance and operates so as to return the potential of each connection point 912 and 913 to the original potential.

Under this circumstance, the response time for the potential variation depends upon a load device, such as the resistors 911 and 914 in which the resistance value is invariable because the MOS transistors 912 and 913 are connected to the resistors 911 and 914 in serial.

Therefore, it is required to reduce the resistance value of each resistor 911 and 914 to improve resistance to the noise and to reduce the affect due to the noise. However, the consumption current inevitably becomes large in this case.

For instance, it is assumed that each of the MOS transistors 912, 913, 921 and 922 has a channel width of 130 μm and a channel length L of 0.7 μm and each of the resistors 911 and 914 has a resistance value of 5K and a consumption current of 300 μA. In this case, the signal is expressed as follows.

Figure 3:
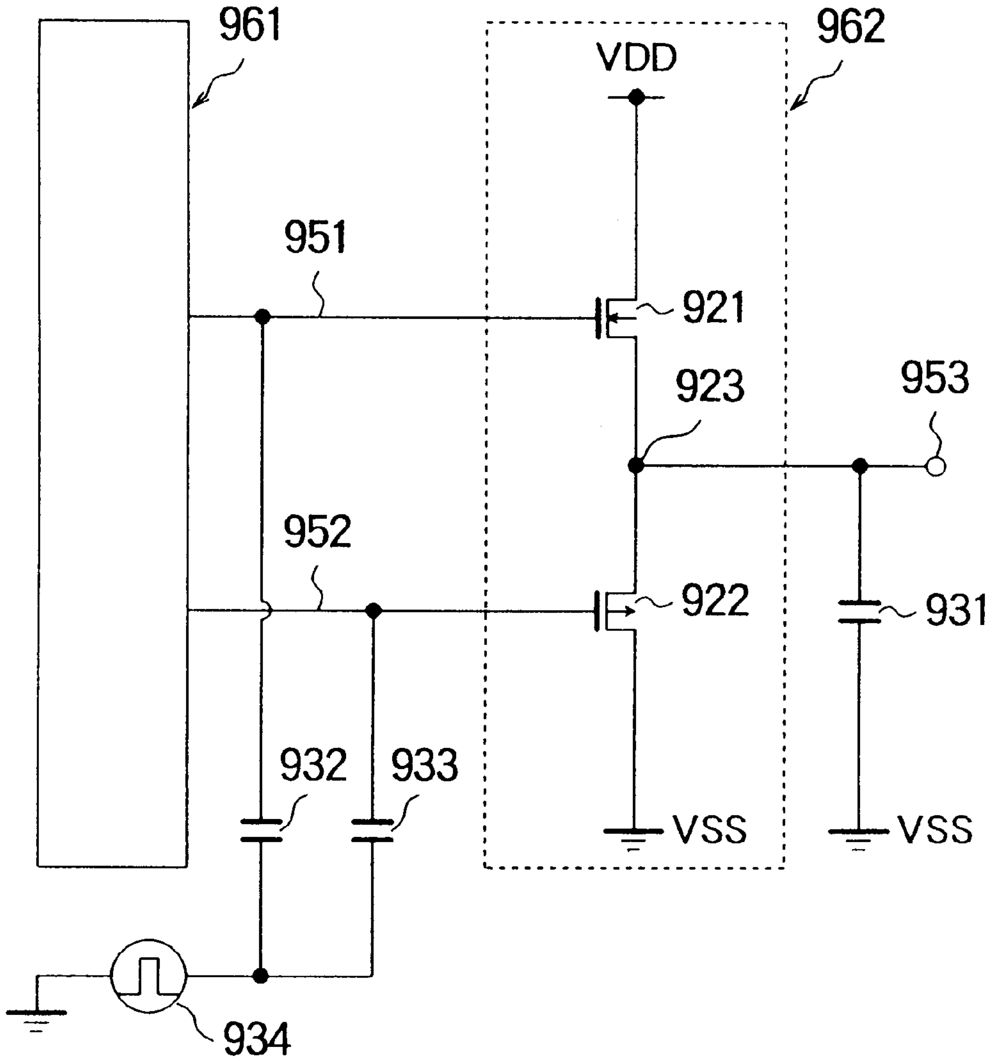
FIG. 3 PRIOR ART
FIG. 3 is a circuit diagram for explaining a problem with respect to the intermediate potential generation circuit illustrated in FIG. 1.

Namely, when a signal having an amplitude of 5 V and a period of 4 ns is transmitted from the signal input source 934 to the connection point 951 via the parasitic capacitor 932 of 0.1 pF and is transmitted to the connection point 952 via the parasitic capacitor 933 having the same static capacitance in FIG. 3, such a state that a capacitor 931 of 5 pF is connected is realized in the output terminal 953. In consequence, the output terminal 953 is varied with the amplitude of 0.83 V.

Reversibly, when the resistance value of each resistor 911 and 914 is selected such that the variation of the potential of the output terminal 953 becomes the amplitude of 0.1 V or less, the consumption current becomes large to 4.66 mA.

Thus, there is a trade-off relationship between resistance to the noise and the low consumption current in the conventional intermediate potential generation circuit.

Further, it is necessary that the threshold voltage Vtn1 of the MOS transistor 912 is set to a lower value than the threshold voltage Vtn2 of the MOS transistor 921 and the absolute value Vtp1 of the threshold value of the MOS transistor 913 is set to a lower value than the absolute value Vtp2 of the MOS transistor 922 in the conventional intermediate generation circuit. Thereby, it is avoided that the MOS transistors 921 and 922 in the output portion 962 are simultaneously turned on in order to suppress the consumption current.

Moreover, it is necessary that the potential difference between the connection points 951 and 952 is set to a larger value than the value that the threshold voltage vtn1 is added to the absolute voltage Vtp1 of the threshold voltage and is set to a lower value than the value that the threshold voltage Vtn2 is added to the absolute value Vtp2 of the threshold voltage.

In addition, it is required that the MOS transistor 912 itself operates between the threshold voltages Vtn1 and Vtn2 and the MOS transistor 913 itself operates between the threshold voltages Vtp1 and Vtp2 in the similar manner in the intermediate potential generation portion 961. Namely, it is necessary that each of the MOS transistors 912 and 913 operate near the threshold voltage of the potential difference between the gate and source. Consequently, the on-resistance is excessively high.

To this end, each of the resistors 911 and 914 must be set to a high resistance value equivalent to each of the MOS transistors 912 and 913 so as to cause to operate the MOS transistors 912 and 913 in the above operation range.

In consequence, a plurality of MOS transistors each of which has a low on-resistance must be serially connected in the gate array. This is because it is difficult to arrange the load device having a high resistance value in the gate array. As a result, the layout area is inevitably increased to arrange a plurality of MOS transistors in the semiconductor integrated circuit.

Further, the P-channel MOS transistor 913 in the intermediate potential generation portion 961 and the P-channel MOS transistor 922 in the output portion 962 are connected to the gate to each other, and the source has approximately the same potential. Therefore, the well which is the back gate of the MOS transistor 913 must be connected to the connection point 951 to give the intermediate potential.

Consequently, the absolute value |Vtp1| of the threshold voltage of the MOS transistor 913 is set lower than the absolute value |Vtp2| of the threshold voltage of the MOS transistor 922 by changing the threshold voltage by the use of the bias effect. As a result, the well, which is the back gate of the MOS transistor 913, must be separated from the other well. Accordingly, the layout area is inevitably increased to be set to the intermediate potential by separating the well in the semiconductor integrated circuit.

Taking the above-mentioned problems into consideration, this invention provides an intermediate potential generation circuit which is capable of supplying a constant voltage irrespective of a large output current.

First Embodiment

Figure 4:
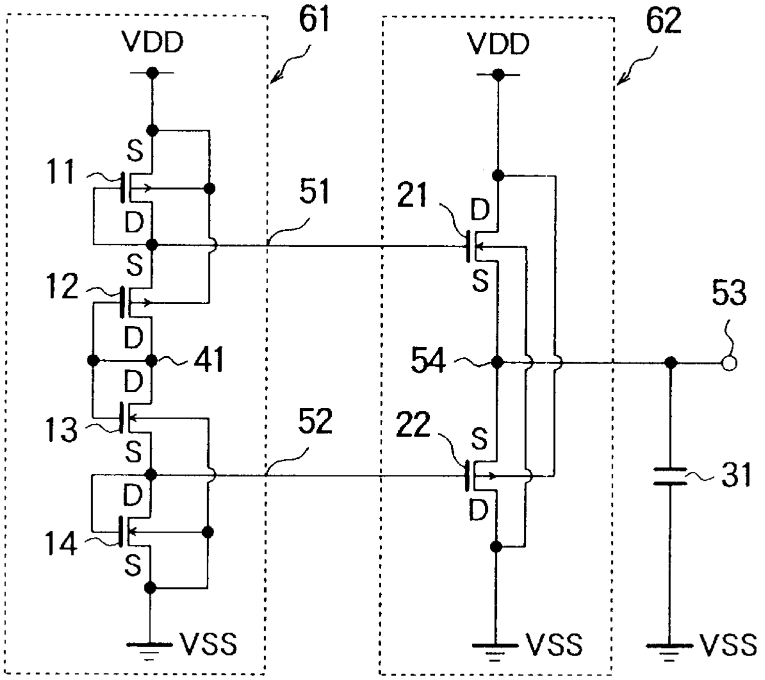
FIG. 4 is a circuit diagram showing an intermediate potential generation circuit according to a first embodiment of this invention.
Figure 5:
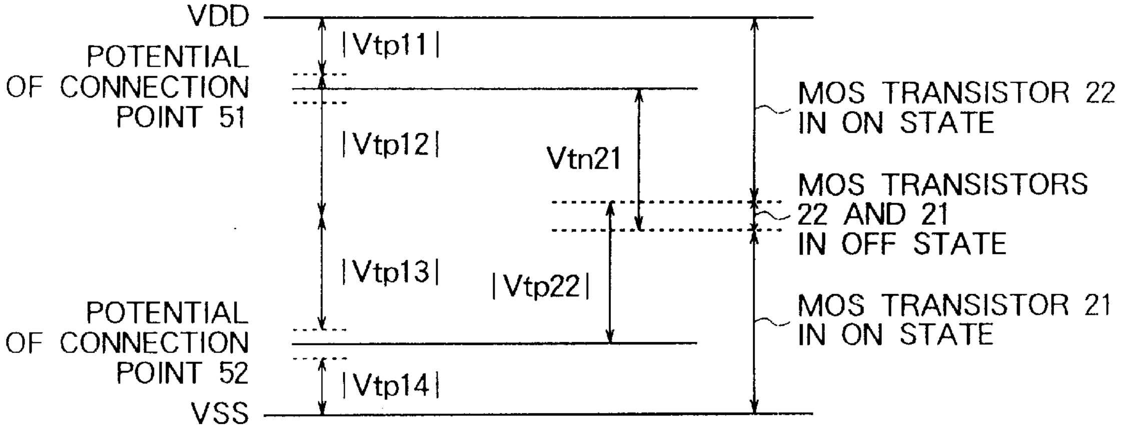
FIG. 5 is a diagram for explaining an operation of the intimidate potential generation circuit according to the first embodiment.

Referring to FIGS. 4 and 5, description will be made about an intermediate potential generation circuit according to a first embodiment of this invention.

An intermediate potential generation circuit includes an intermediate potential generation portion 61, an output portion, and a capacitor 31, as illustrated in FIG. 4.

P-channel MOS transistors 11 and 12 and N-channel MOS transistors 13 and 14 are connected in series in this order between power sources VDD (will be called a first voltage source) and VSS (will be a called a second voltage source) in the intermediate potential generation portion 61. In this event, each gate of the MOS transistors 11 through 14 is connected in common to each drain.

Namely, the gate of the first MOS transistor 11 is connected to a connection point 51 between the MOS transistors 11 and 12 while the gate of the MOS transistor 14 is connected to a connection point 52 between the MOS transistors 13 and 14. Each gate of the MOS transistors 12 and 13 is connected to each other at a connection point of both drains of the MOS transistors 12 and 13.

Further, each back gate of the P-channel MOS transistors 1 and 12 is connected to VDD while each back gate of the N-channel MOS transistors 13 and 14 is connected to VSS.

With such a structure, the intermediate potential generation portion 61 generates first and second signals each of which has first and second intermediate potentials between VDD and VSS which are different in potential from each other. The first and the second signals are generated from a connection point 51 through a first signal terminal and from a connection point 52 through a second signal terminal, respectively.

In addition, an N-channel MOS transistor 21 and a P-channel MOS transistor 22 are connected in series between the power sources VDD and VSS in the output portion 62. In the MOS transistor 21, the drain is connected to VDD and the gate is coupled to the connection point 51 of the intermediate potential generation portion 61. On the other hand, the MOS transistor 22 has the source connected to the source of the MOS transistor 21, the drain connected to VSS, and the gate coupled to the connection point 52 of the intermediate potential generation portion 61. Moreover, an output terminal 53 is derived from the connection point 54 between the MOS transistors 211 and 22.

In the illustrated example, the back gate of the N-channel MOS transistor 21 is connected to VSS while the back gate of the P-channel MOS transistor 22 is connected to VDD. Furthermore, a capacitor is coupled between the output terminal and VSS.

With such a structure, a third intermediate potential between the first intermediate potential and the second intermediate potential is produced through the output portion 62 as a power supply voltage.

Subsequently, description will be made about an operation of the intermediate potential generation circuit according to the first embodiment, referring to FIG. 4 together with FIG. 5.

In the intermediate potential generation portion 61, the potential of the connection point 51 is lower than a difference between the absolute value |Vtp11| of the threshold voltage of the MOS transistor 11 and the power source VDD. On the other hand, the potential of the connection point 52 is higher than the value equal to a sum of the threshold voltage Vtn14 of the MOS transistor 14 and VSS.

Each gate of the MOS transistors 12 and 13 is connected in common to each other, and each drain thereof is also connected in common to each other to form the connection point 41 of both drains. In consequence, the potential of the connection point 51 is higher than the value which is equal to a sum of the absolute value |Vtp12| of the threshold voltage of the MOS transistor 12 and the potential of the connection point 41.

Likewise, the potential of the connection point 52 is lower than a difference between the threshold voltage Vtn13 of the MOS transistor 13 and the potential of the connection point 41. Each potential of the connection points 51, 41 and 52 shares the potential difference between the power sources VDD and VSS on the condition that the above relationship is kept.

The N-channel MOS transistor 21 is turned off when the potential of the connection point 54 becomes lower than the value in which the threshold voltage Vtn21 of the MOS transistor 21 is subtracted from the potential of the connection point 51 because the gate is connected to the connection point 51.

Likewise, the P-channel MOS transistor 22 is turned on when the potential of the connection point 54 becomes higher than the value in which the absolute value |Vtp22| of the threshold voltage of the MOS transistor 22 is added to the potential of the connection point 52 because the gate is connected to the connection point 52.

Further, each back gate of the N-channel MOS transistors 13,14 and 21 is connected to VSS while each back gate of the P-channel MOS transistors 11, 12 and 22 is connected to VDD. To this end, the threshold voltage Vtn13 of the MOS transistor 13 is lower than the threshold voltage Vtn21 of the MOS transistor 21 while the absolute value |Vtp22| of the threshold voltage of the MOS transistor 22 is lower than the absolute voltage |Vtp12| of the threshold voltage of the MOS transistor 12.

Consequently, the N-channel MOS transistor 21 and the P-channel MOS transistor 22 is not turned on at the same time in the output portion 62. Therefore, even when each drive capability of the MOS transistors 21 and 22 becomes large, no current cause to flow from the power source VDD to VSS via the MOS transistors 21 and 22.

Further, each of the MOS transistors 11 through 14 has an on-resistance which is equal to each other by changing the size of the transistor. Thereby, each MOS transistor 11 through 14 causes to operate near the threshold voltage. Consequently, the MOS transistors 21 and 22 can prevent from turning off at the same time in the output portion 62 by adjusting each potential of the connection points 51 and 52.

When each of the MOS transistors 21 and 22 is controlled so as to turn on by adjusting the potential, each of the MOS transistors 21 and 22 has a high on-resistance because it operates near the threshold voltage. However, the each of the MOS transistors 21 and 22 enables a high speed operation by suppressing the affect due to the noise because the capacitor 31 is connected to the output terminal 53.

Moreover, when the opposite polarization of the capacitor 31 is connected to VDD, or when the capacitor 31 is formed between equivalent stable potentials, the above same effect can be obtained.

A current which flows from VDD to VSS via the MOS transistors 11 through 14 becomes small in the intermediate generation portion 61 because each of the MOS transistors 11 through 14 operates near the threshold voltage.

Further, when the total of the threshold voltages is excessively small as compared to the potential difference between the power source and VDD and VSS, another P-channel MOS transistor that has a gate connected to the drain like the MOS transistor 11 may be inserted between the P-channel MOS transistor 11 and VDD. Alternatively, another N-channel MOS transistor that has a gate connected to the drain like the MOS transistor 14 may be inserted between the N-channel MOS transistor 14 and VSS. Thereby, the current which flows from the power sources VDD to VSS can be reduced.

The P-channel MOS transistor 11 or the N-channel MOS transistor 14 which has the gate connected to the drain is used as the load device in the intermediate generation portion 61. In consequence, the on-resistance is changed so that the noise which is transmitted to the connection points 51 and 52 is cancelled. As a result, resistance to the noise and the low consumption current can be realized.

For instance, it is assumed that a channel width W of each MOS transistor in the intermediate potential generation circuit 61 is equal to 130 $\mu$m, a channel length is equal to 0.7 $\mu$m, and a static capacitance of the capacitor 31 is equal to 5 pF.

In this condition, it is also assumed that a signal (noise) having an amplitude of 5 V and a period of 4 ns is transmitted to the connection point 51 via the parasitic capacitance 932 of 0.1 pF and the connection point 52 via the parasitic capacitance 933 having the same parasitic capacitance from the signal input source 934, as illustrated in FIG. 3. In this event, it has been confirmed by simulation that the variation of the potential of 0.1 V or less and the consumption current of 300 $\mu$A appear at the output terminal 53.

In contrast, the potential of the output terminal 953 is varied with the amplitude of 0.83 V of 8 times when the consumption current is identical with the above case in the conventional potential generation circuit. Reversely, it is confirmed through the simulation that the consumption current becomes 4.66 mA of 15.5 times when the output terminal 953 is varied in the same manner.

Namely, the variation of the output potential becomes about 1/8 when the consumption current is equal to the conventional case in the intermediate potential generation circuit of this invention while the consumption current is becomes about 1/15 when the variation of the output potential is equal to the conventional case.

Thus, the MOS transistors are connected so that the on-resistance of the MOS transistor is changed so as to suppress the potential variation due to the noise. Consequently, the variation of the output terminal voltage can be restrained by compensating a voltage drop on the condition that a large output current flows with a large current drive capability. Moreover, a large drive capability which is excellent in resistance to the noise can be obtained with the low consumption current.

The high on-resistance can be realized by using the P-channel MOS transistor 11 or the N-channel MOS transistor 14 that has the gate connected to the drain in the intermediate potential generation circuit according to this embodiment. In particular, this structure is effective for the case that the load device of the high resistance can not be arranged or formed in a semiconductor substrate.

For instance, the high resistance value must be obtained by connecting a plurality of transistors having a low resistance in the field of the gate array in the conventional intermediate generation circuit when a transistor is used in an on-state, as disclosed in FIG. 3 and in the above-mentioned conventional reference.

In contrast, the P-channel MOS transistor 11 which has a high on-resistance and operates near the threshold voltage is used in the intermediate potential generation circuit of this invention. In consequence, the sufficient high resistance can be accomplished when each transistor is used in the on-state in the above gate array. As a result, the layout area is remarkably reduced as compared to the conventional circuit.

In the meanwhile, it is to be noted that the P-channel MOS transistor is not a single, but a plurality of P-channel MOS transistors may be connected in series. This is also applied to the N-channel MOS transistor 14 operable as the resistance device.

Further, a well must be inevitably formed to separate MOS transistors having sufficient threshold voltages in the conventional intermediate generation circuit when the threshold voltage is changed by the use of the back bias effect. In contrast, the variation of the threshold voltage due to the back bias effect can be realized by using a potential difference of the source in the intermediate potential generation circuit of this invention. Therefore, it is unnecessary to form the well even when the threshold voltage is changed by the use of the back bias effect. In consequence, the layout dimension can be reduced because the well becomes unnecessary. Thereby, the difference of the threshold voltages of the MOS transistors can be realized with a small layout area as compared to the conventional case.

Second Embodiment

Figure 6:
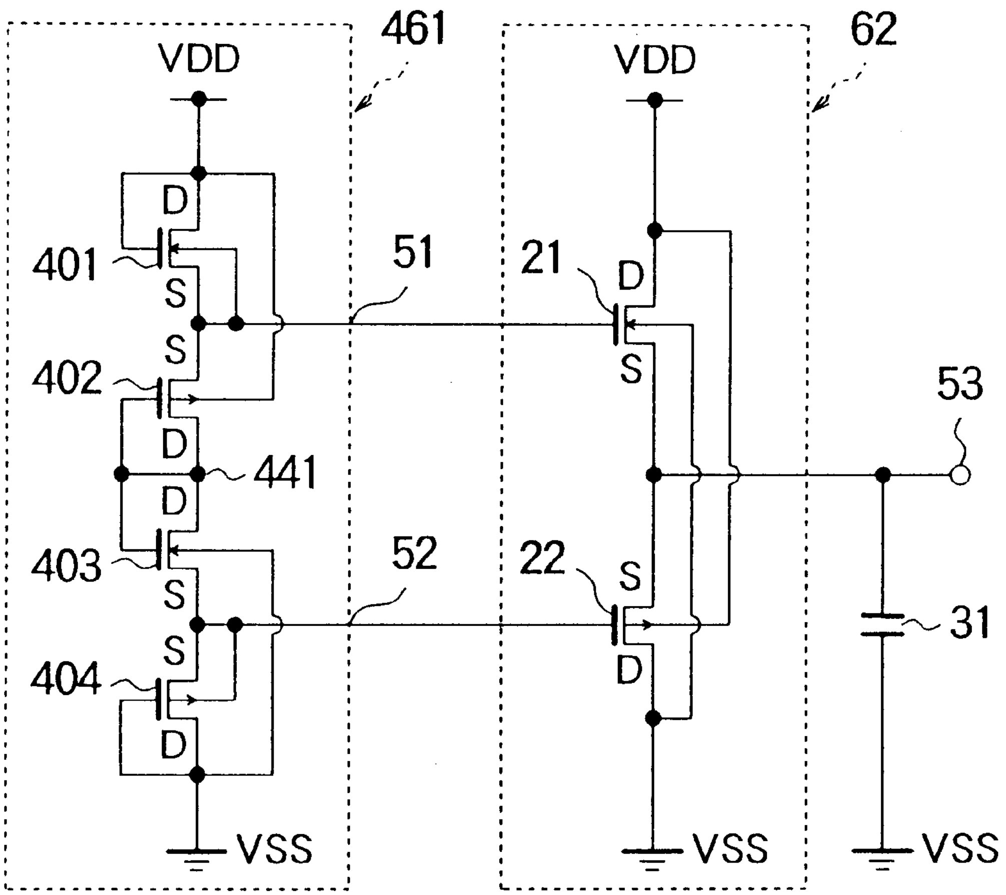
FIG. 6 is a circuit diagram showing an intermediate potential generation circuit according to a second embodiment of this invention.

Subsequently, description will be made about an intermediate potential generation circuit according to a second embodiment of this invention, referring to FIG. 6.

The intermediate potential generation circuit includes an intermediate potential generation circuit 461, an output portion 62, and a capacitor 31. In this event, the output portion 62 has the same structure as that in the first embodiment. An N-channel MOS transistor 401, a P-channel MOS transistor 402, an N-channel MOS transistor 403 and a P-channel MOS transistor 404 are serially connected between power sources VDD and VSS in this order in the intermediate potential generation portion 461.

Each gate of the MOS transistors 401 through 404 is connected to each drain. The back gate of the N-channel MOS transistor 401 is coupled to a connection point between the MOS transistors 401 and 402 while the back gate of the P-channel MOS transistor 404 is coupled to a connection point between the MOS transistors 403 and 404. Further each gate of the MOS transistor 402 and the MOS transistor 403 is connected to each other and a connection point thereof is coupled to a connection point 441 of both drains of the NOS transistors 402 and 403. Moreover, the back gate of the P-channel MOS transistor 402 is connected to the power sources VDD while the back gate of the N-channel MOS transistor 403 is connected to VSS.

With such a structure, the intermediate potential generation portion generates first and second signals of first and second intermediate potentials between VDD and VSS. The first and the second signals are different from each other in potential and are produced through a connection points 51 and 52 which form first and second signal terminals, respectively.

In this event, it is necessary to prepare a P-type well and an N-type well which separate a semiconductor substrate in the second embodiment. However, even when each threshold voltage of the P-channel MOS transistor and the N-channel MOS transistor is fluctuated, the affect due to the fluctuation can be reduced.

With this structure, each potential of the connection points 51, 441 and 52 is determined by sharing each on-resistance of the MOS transistors 410 through 404 which operate near the threshold voltage like the intermediate potential generation portion 61 in the first embodiment.

The P-channel MOS transistor 404 and the N-channel MOS transistor 401 are placed on the power sources VDD and VSS sides of the connection point 441 in the above intermediate potential generation circuit. In consequence, even when each threshold voltage of all N-channel MOS transistors is largely fluctuated, each threshold voltage of all P-channel MOS transistors is scarcely fluctuated, and, as a result, the potential variation is very low at the connection point 441. Thereby, the potential at the connection point 51 becomes high while the potential of the connection point 52 becomes low.

Under the circumstances, although each threshold voltage of the N-channel MOS transistor 21 and the P-channel MOS transistor 22 is varied in the output portion 62, each potential variation at the connection points 51 and 52 is suppressed by the variation of each threshold voltage of the MOS transistors 21 and 22.

Herein, it is to be note that as the MOS transistor has a large potential difference between the source and the back gate, the affect due to the variation of the threshold voltage becomes large. This property serves to suppress the variation of the output potential. In this event, the N-channel MOS transistor 401 as the resistance device may not a single, but a plurality of MOS transistors may be connected in series. This is also applied to the P-channel MOS transistor as the resistance device.

Resistance to the noise can be improved, and the large current drive capability can be obtained with the low consumption current in the intermediate potential generation circuit according to the second embodiment.

Further, it is unnecessary to connect a plurality of the transistors in on-states as load devices. In consequence, the layout area can be largely reduced as compared to the conventional case.

Third Embodiment

Figure 7:
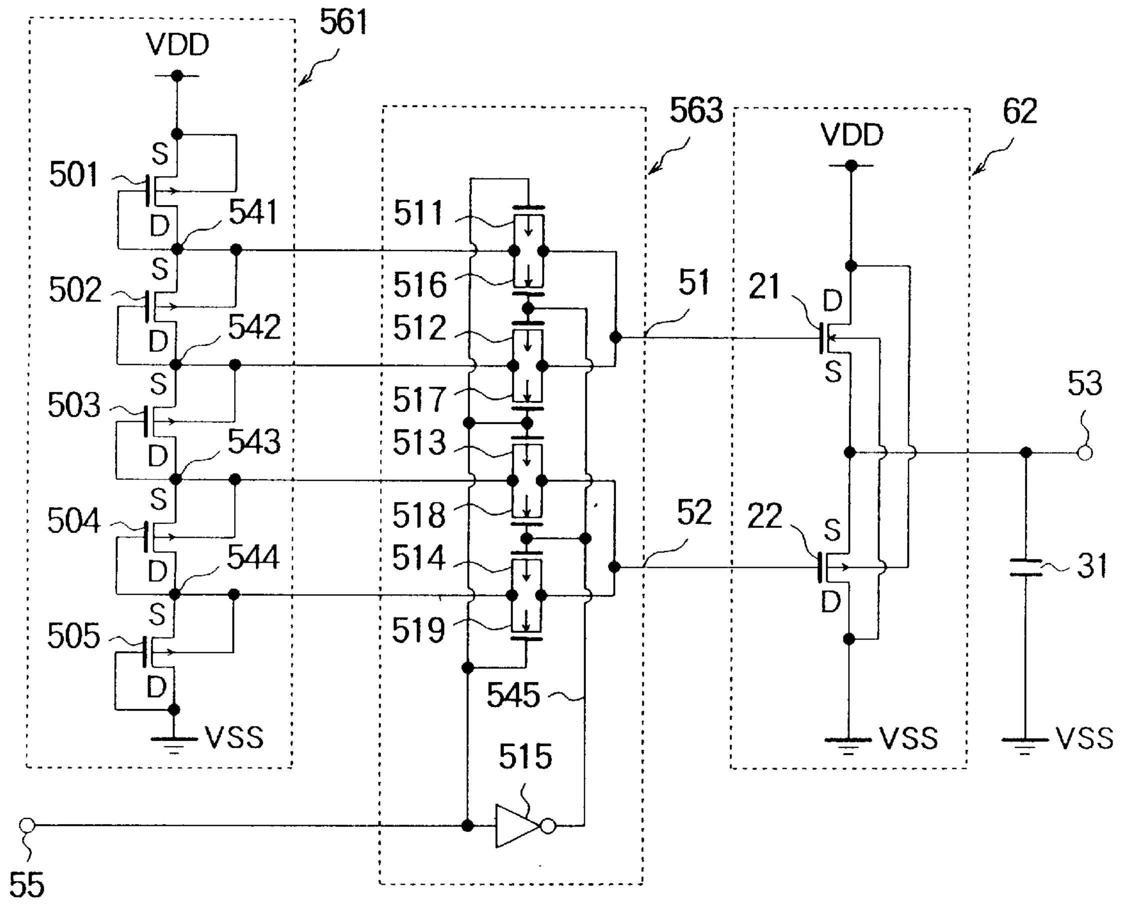
FIG. 7 is a circuit diagram showing an intermediate potential generation circuit according to a third embodiment of this invention.

Subsequently, description will be made about an intermediate potential generation circuit according to a third embodiment, referring to FIG. 7.

The above intermediate potential generation circuit includes an intermediate potential generation circuit 561, a potential signal selection portion 563, an output portion 62 and a capacitor 31. In this event, the output portion 62 is similar to that in the first embodiment.

Specifically, P-channel MOS transistors 501, 502, 503, 504 and 505 are serially connected in this order between power sources VDD and vsS via connection points 541, 542, 543 and 544 in the intermediate potential generation portion 561. In this case, each gate is connected to each drain and each back gate is connected to each source in each of the P-channel MOS transistors 501 through 505. Namely, the gate is coupled to the connect point 542 and the back gate is connected to VDD in the MOS transistor 501 while the gate is coupled to the connection point 542 and the back gate is coupled to the connection point 541 in the MOS transistor 502.

Further, the gate is coupled to the connect point 543 and the back gate is coupled to the connection point 542 in the MOS transistor 503 while the gate is coupled to the connection point 544 and the back gate is coupled to the connection point 5413 in the MOS transistor 504. Moreover, the gate is connected to VSS and the back gate is coupled to connection point 544 in the MOS transistor 505.

With such a structure, the intermediate potential generation portion 561 generates four signals each of which has one among a first through fourth intermediate potential between VDD and VSS and is different in potential to each other.

Alternatively, it is possible that the P-channel MOS transistors 501 through 505 which are connected in serial may be replaced by an N-channel MOS transistors in the intermediate generation portion 561. In the event, each source is commonly connected to each gate at a low potential side (VSS) and each drain is connected at a high potential side (VDD) in the N-channel MOS transistor.

A transfer gate which is composed of a P-channel MOS transistor 511 and an N-channel MOS transistor 516 is connected between the connection point 541 and the connection point 51 in the potential signal selection portion 563. Further, a transfer gate which is composed of a P-channel MOS transistor 512 and an N-channel MOS transistor 517 is connected between the connection point 542 and the connection point 51.

Moreover, a transfer gate which is composed of a P-channel MOS transistor 513 and an N-channel MOS transistor 518 is connected between the connection point 543 and the connection point 52. In addition transfer gate which is composed of a P-channel MOS transistor 514 and an N-channel MOS transistor 519 is connected between the connection point 544 and the connection point 52.

In this event, each back gate of the P-channel MOS transistors 511 through 514 is connected to VDD while each back gate of the N-channel MOS transistors 516 through 519 is connected to VSS.

Further, each gate of the P-channel MOS transistors 511 and 513 and the N-channel MOS transistors 517 and 519 is connected to an input of an inverter 515. On the other hand, each gate of the N-channel MOS transistors 516 and 518 and the P-channel MOS transistors 512 and 514 is connected to an output of the inverter 515. A continuity control terminal 55 is connected to the input terminal of the inverter 515. The above transfer gates are controlled by the potential of the continuity control terminal 55.

Each back gate of the P-channel MOS transistors 501 through 505 is connected to each source to prevent an increase of the threshold voltage due to the back bias effect in the intermediate generation portion 561. In this event, the potential between the power sources VDD and VSS is finely shared by these MOS transistors 501 through 505. Further, two signals among four signals from the intermediate potential generation portion 561 are selected by conductively controlling each transfer gate by the use of the potential of the continuity control terminal 55 in the potential signal selection portion 563. Further, a signal of a high potential side among the two signals is supplied from the connection point 51 (first signal terminal) as a first signal while a signal of a low potential side is supplied from the second connection point 52 (second signal terminal) as a second signal. Thereby, each potential of the connection points 51 and 52 is variable so that the potential of the output terminal 53 is changed.

Resistance to the noise can be increased and the large current drive capability can be obtained with the low consumption current in the third embodiment. In consequence, the layout area can be largely reduced.

Fourth Embodiment

Figure 8:
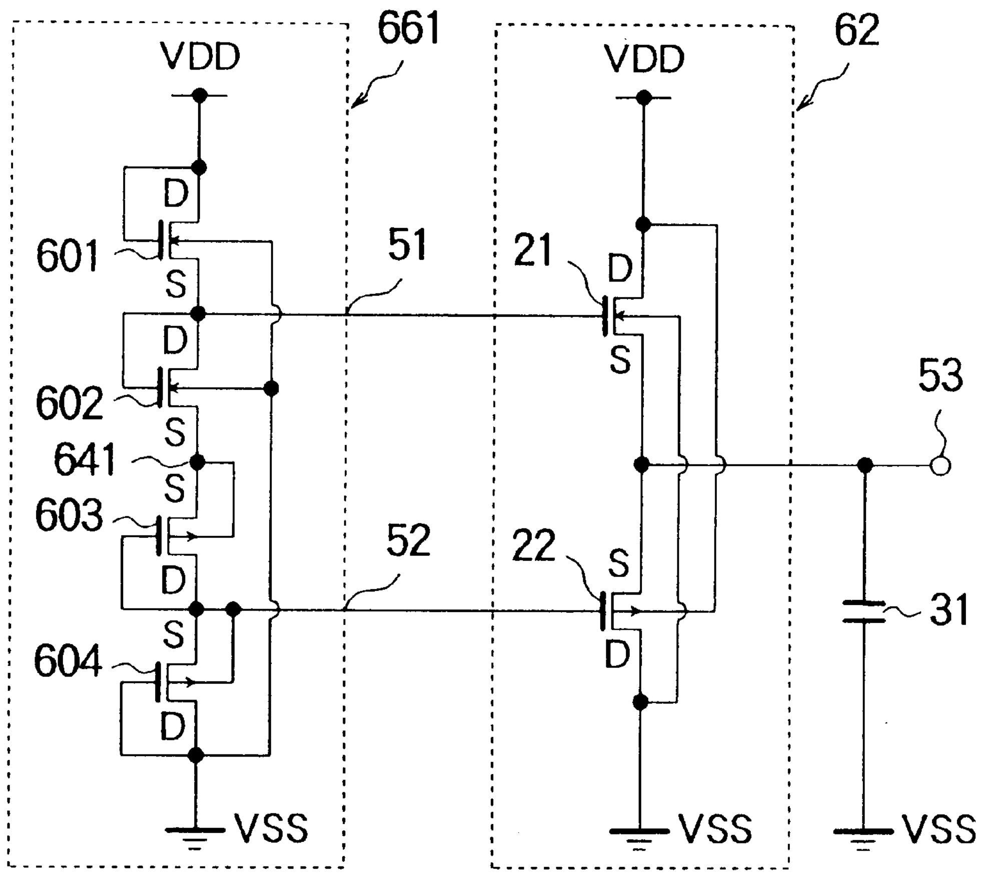
FIG. 8 is a circuit diagram showing an intermediate potential generation circuit according to a fourth embodiment of this invention.

Subsequently, description will be made about an intermediate potential generation portion according to a fourth embodiment of this invention, referring to FIG. 8.

The above intermediate potential generation circuit includes an intermediate potential generation circuit 661, an output portion 62 and a capacitor 31. In this event, the output portion 62 has a similar structure with the first embodiment.

Specifically, N-channel MOS transistors 601 and 602 and P-channel MOS transistors 603 and 604 are serially connected in this order between power sources VDD and VSS in the intermediate potential generation portion 661. In this case, the gate is connected to the drain and the back gate is connected to VSS in the N-channel MOS transistor 601 (first MOS transistor).

Further, the gate is connected to the drain and the back gate is connected to VSS in the N-channel MOS transistor 602 (second MOS transistor). Moreover, the gate is connected to the drain so that a connection point 52 between the MOS transistors 603 and 604 becomes conductive and the back gate is connected to a connection point 641 between the MOS transistors 602 and 603 in the P-channel MOS transistor 603 (third MOS transistor). On the other hand, the gate is connected to the drain and the back gate is connected to a connection point 52 between the MOS transistors 603 and 604 in the P-channel MOS transistor (fourth MOS transistor).

With such a structure, the intermediate potential generation portion 661 generates first and second signals having first and second intermediate potential between VDD and VSS which are different in potential to each other, and supplies them from the connection point 51 as a first signal terminal and from the connection point 52 as a second signal terminal, respectively.

The MOS transistor 601, in which the potential difference between the source (connection point 51) and the back gate (VSS) is large to obtain a high threshold voltage by the use of the back bias effect, is used in the intermediate generation portion 661. Consequently, the potential difference of the total of the absolute values of the threshold voltages of the MOS transistors 601 through 604 which are connected to between the power sources VDD and VS becomes small as compared to the potential difference between the power source VDD and VSS. These MOS transistors 601 through 604 operate near the threshold voltage to further suppress the consumption current.

Herein, the N-channel MOS transistor 601 as the resistance device is not limited to a single, a plurality of MOS transistor may be connected in serial. This fact is applied to the P-channel MOS transistor as the resistance device.

Resistance to noise can be increased and the large current drive capability can be obtained with the low consumption current in the fourth embodiment. In consequence, the layout area can be largely reduced.

Fifth Embodiment

Figure 9:
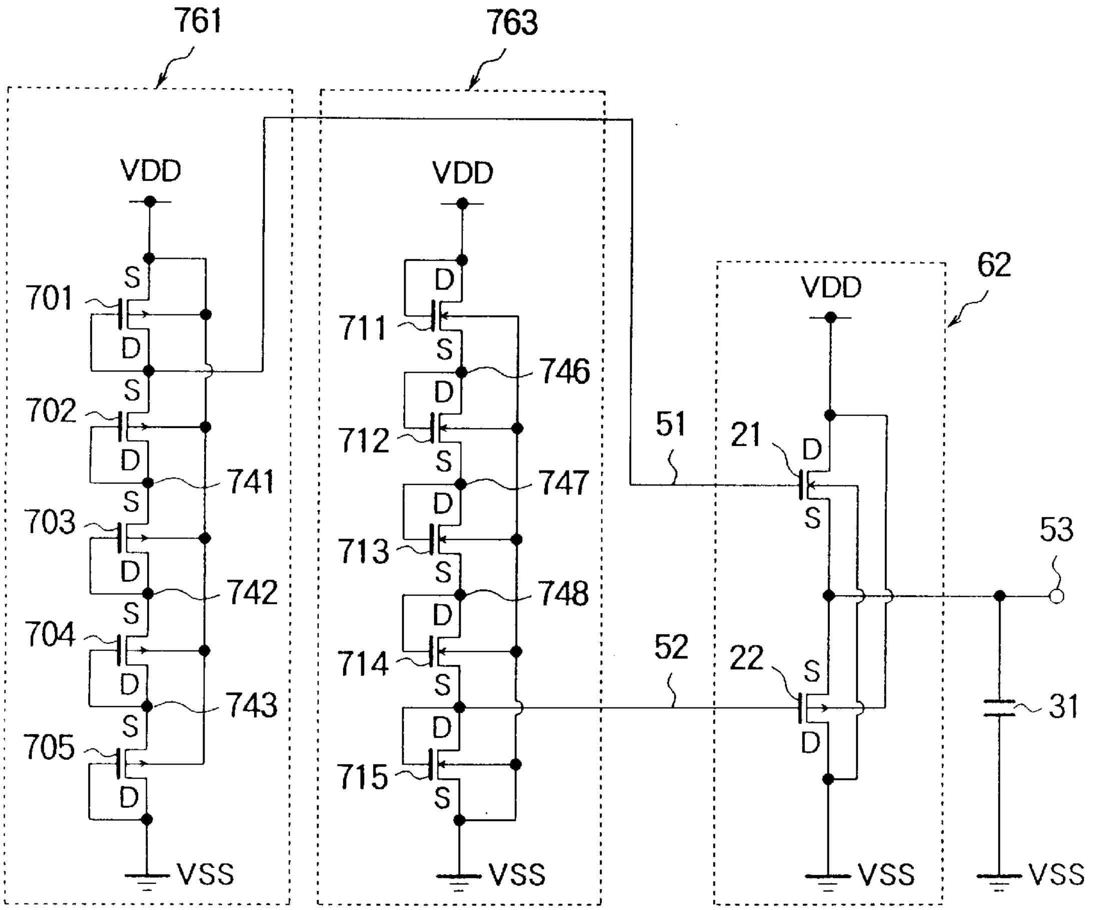
FIG. 9 is a circuit diagram showing an intermediate potential generation circuit according to a fifth embodiment of this invention.

Subsequently, description will be made about an intermediate potential generation circuit according to a fifth embodiment of this invention, referring to FIG. 9.

The above intenerate potential generation circuit includes first and second intermediate potential generation portions 761 and 763, an output portion and a capacitor 31. In this event, the output portion 62 is similar to that in the first embodiment.

Specifically, P-channel MOS transistors 701 through 705 are serially connected between power sources VDD and VSS via connection point 51, and connection points 741, 742 and 743 in this order in the first intermediate potential generation portion 761. Further, each gate is connected to each drain at the VSS side and each back gate is connected VDD in each of the P-channel MOS transistors 701 through 705.

Namely, the gate of the P-channel MOS transistor 701 is connected to the connection point 51 while the gate of the MOS transistor 702 is connected to the connection point 741. On the other hand, the gate of the MOS transistor 703 is connected to the connection point 742 while the gate of the MOS transistor 704 is connected to the connection point 743. Moreover, the gate of the MOS transistor 705 is connected to VSS.

With such a structure, the first intermediate potential generation portion 761 generates five signals having one among first through fifth intermediate potential between VDD and VSS which are different in potential to each other, and supplies one among five signals from the connection point 51 (first signal terminal) as a first signal.

On the other hand, N-channel MOS transistors 711 through 725 are serially connected between the power sources VDD and VSS via connection points 746, 747, and 748 and the connection point 52 in the second potential generation portion 763. Further, each gate is connected to each drain and each back gate is connected to VSS in each of the N-channel MOS transistors 711 through 715.

Namely, the gate of the N-channel MOS transistor 711 is connected to VDD while the gate of the MOS transistor 712 is coupled to the connection point 746. Further, the gate of the MOS transistor 713 is coupled to the connection point 747 while the gate of the MOS transistor 714 is coupled to the connection point 748. Further, the gate of the MOS transistor 715 is coupled to the connection point 52.

With such a structure, the second intermediate potential generation portion 763 generates five signals having one among first through fifth intermediate potential between VDD and VSS which are different in potential to each other, and supplies one among five signals from the connection point 52 (second signal terminal) as a second signal.

As mentioned before, the back gate of each MOS transistor is connected to VDD in the P-channel type in the first intermediate potential generation portion 761 while the back gate of each MOS transistor is connected to VSS in the N-channel type in the second intermediate potential generation portions 763. In this event, the source potential is different to each other. In consequence, the absolute value of the threshold voltage is higher at the VSS side in the P-channel type by the back bias effect while it is higher at the VDD side in the N-channel MOS transistor. In this case, the voltage between VDD and VSS is uniformly not shared by each MOS transistor in accordance with the difference between these threshold voltages.

Further, the sharing method is different to each other between the first potential generation portion 761 in which the P-channel MOS transistors are connected in serial and the second potential generation portion 763 in which the N-channel MOS transistors are connected in serial.

Thus, the intermediate potential which corresponds to each threshold voltage of the N-channel MOS transistor 21 and the P-channel MOS transistor 22 can be generated by using the sharing difference for the voltage between the power sources VDD and VSS in this embodiment.

Resistance to the noise can be improved and the large current drive capability can be obtained with the low consumption current to reduce the layout area in the fifth embodiment.

Sixth Embodiment

Figure 10:
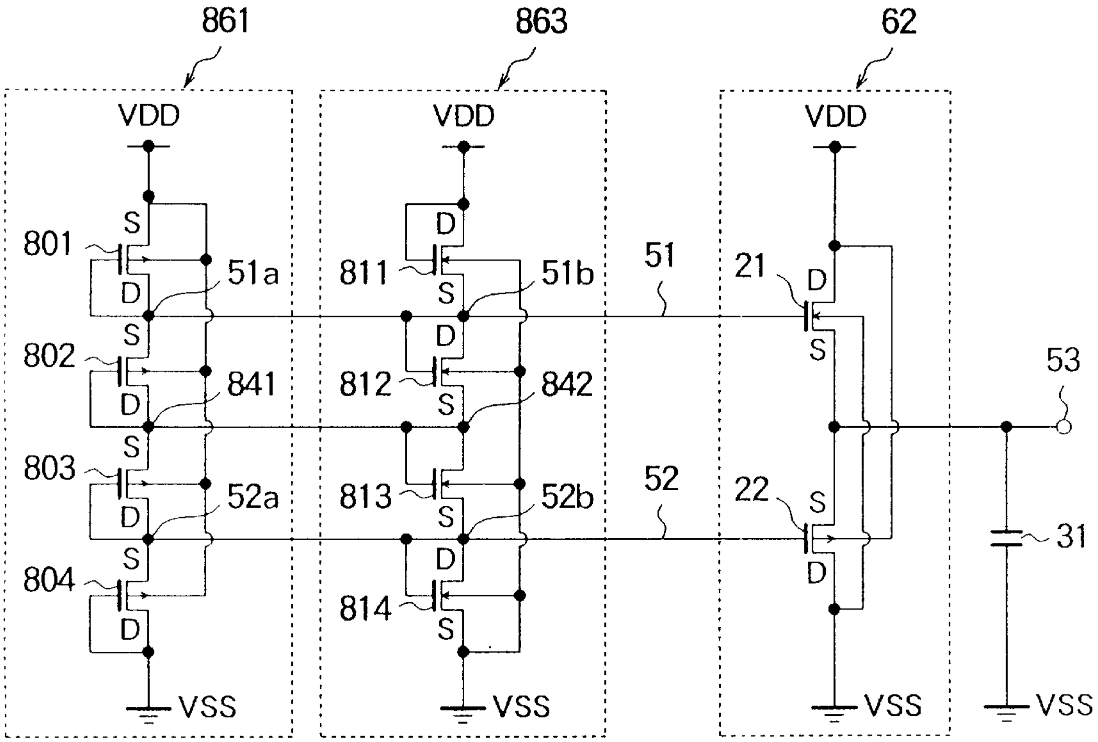
FIG. 10 is a circuit diagram showing an intermediate potential generation circuit according to a sixth embodiment of this invention.

Subsequently, description will be made about an intermediate potential generation circuit according to a sixth embodiment of this invention, referring to FIG. 10.

The above intermediate potential generation circuit includes first and second intermediate potential generation portions 861 and 863, an output portion 62 and a capacitor 31. In this event, the output portion 62 is similar to that in the first embodiment.

Specifically, P-channel MOS transistors 801 through 804 are serially connected between power sources VDD and VSS in this order in the first potential generation portion 861. In this event, each gate is connected to each drain and each back gate is connected to VDD in each of the P-channel MOS transistor 801 through 804.

Namely, the gate of the MOS transistor 801 is coupled to a connection point 51*a* between the MOS transistors 801 and 802 while the gate of the MOS transistor 802 is coupled to a connection point 841 between the MOS transistors 802 and 803.

Further, the gate of the MOS transistor 803 is coupled to a connection point 52*a* between the MOS transistors 803 and 804 while the gate of the MOS transistor 804 is connected to VSS.

With such a structure, the first intermediate potential generating circuit 861 generates three signals having one among first through third potential between VDD and VSS which are different in the potential to each other.

On the other hand, N-channel MOS transistors 811 through 814 are serially connected between the power sources VDD and VSS in the second potential generation portion 863. In this event, each gate is connected to each drain and each back gate is connected to VSS in each of the N-channel MOS transistors 811 through 814.

Namely, the gate of the MOS transistor 811 is connected to VDD while the gate of the MOS transistor 812 is coupled to a connection point 51*b* between the MOS transistors 811 and 812. Further, the gate of the MOS transistor 813 is coupled to a connection point 842 between the MOS transistors 812 and 813 while the gate of the MOS transistor 814 is coupled to a connection point 52*b* between the MOS transistors 813 and 814.

Moreover, the connection point 51*b* is coupled to both the connection point 51*a* in the first intimidate generation circuit 861 and the gate of the N-channel MOS transistor 21 in the output portion 62. In the meanwhile, the connection point 52*b* is coupled to both the connection point 52*a* in the first intimidate generation circuit 861 and the gate of the P-channel MOS transistor 22 in the output portion 62.

With such a structure, the second intimidate potential generation circuit 863 is given three signals from the first intermediate potential generation circuit 861 and generates first and second signals having first and second intimidate potential between VDD and VSS which are different in the potential to each other, and supplies them into the output portion 62 via the connection points 51 and 52.

As mentioned before, the gate and drain of the P-channel MOS transistor 801 are connected to each other while the gate and drain of the N-channel MOS transistor 811 are also connected to each other. Further, the drain and source of both MOS transistors 801 and 811 are connected to each other. Consequently, the potential of the connection point 51 is lower than the value in which a lower threshold voltage among the absolute values of the threshold voltages of the MOS transistors 801 and 811 is subtracted from VDD.

On the other hand, the gate and drain of the P-channel MOS transistor 804 are connected to each other while the gate and drain of the N-channel MOS transistor 814 are also connected to each other. Further, the source and drain of both MOS transistors 804 and 814 are connected to each other. Consequently, the potential of the connection point 52 is higher than the value in which a lower threshold voltage among the absolute values of the threshold voltages of the MOS transistors 804 and 814 is added to VSS.

Moreover, the connection points 51, 841 (842) and 52 keeps the above relationship and becomes the potential which is shared with each on-resistance by the operation of the MOS transistor near the threshold voltage. In consequence, the effect which is equivalent to the first embodiment can be also obtained in the sixth embodiment.

Resistance to the noise can be improved and the large current drive capability can be obtained with the low consumption current to reduce the layout area in the sixth embodiment.

As mentioned above, this invention has been explained on the basis of the preferred embodiments. However, the intermediate potential generation circuit is not limited to the above embodiments, and is also applicable for the other modified intermediate potential generation circuits.

What is claimed is:

1. An intermediate potential generating circuit, comprising:

an intermediate potential generating portion which generates first and second signals having first and second intermediate potentials different from each other between a first source voltage and a second source voltage and which supplies said first and second signals via first and second signal terminals; and said intermediate potential generating portion including;

at least one first MOS transistor which is connected between said first and second voltage sources and which has a first gate and a first drain connected to the first gate;

second and third MOS transistors which are connected in series between the first signal terminal and the second signal terminal and which have conductive types different from each other.

at least one fourth MOS transistor which is connected between said first and second voltage sources and which has a second gate and a second drain connected to the second gate;

an output portion which supplies a power supply having a third intermediate potential between the first intermediate potential and the second intermediate potential via an output terminal;

said output portion including;

a fifth MOS transistor which has a third drain connected to said first power source, a third source coupled to the output terminal, and a third gate coupled to the first signal terminal; and a sixth MOS transistor which has a fourth drain, a fourth source and a fourth gate wherein the fourth drain is connected to said second power source, the fourth source is coupled to the output terminal and the fourth gate is coupled to the second signal terminal.

2. A circuit as claimed in claim 1, wherein said first power source is positioned on a higher potential side while said second power source is positioned on a lower potential side, and said second MOS transistor is of a P-channel type and is positioned on the higher potential side while said third MOS transistor is of an N-channel type and is positioned on the lower potential side.

3. A circuit as claimed in claim 1, wherein:

said first MOS transistor further includes a first back gate which is connected to the first source while said fourth MOS transistor further includes a second back gate which is connected to the second source.

4. A circuit as claimed in claim 1, wherein:

said first power source is positioned on a higher potential side while said second power source is positioned on a lower potential side, said fifth MOS transistor is of a N-channel type and further includes a third back gate which is connected to said second power source while said sixth MOS transistor is of a P-channel type and further includes a forth back gate which is connected to said first power source.

5. A circuit as claimed in claim 1, further comprising:

a capacitor which is connected between the output terminal and said second power source.

6. An intermediate potential generating circuit, comprising:

an intermediate potential generating portion which generates first and second signals having first and second intermediate potentials different from each other between a first source terminal for supplying a first source voltage and a second source terminal for supplying a second source voltage and which supplies said first and second signals via first and second signal terminals; and said intermediate potential generating portion including;

at least one first MOS transistor which is connected between said first and second source terminals and which has a first gate and a first drain connected to the first gate;

second and third MOS transistors which are connected in series between the first signal terminal and the second signal terminal and which have conductive types different from each other;

at least one fourth MOS transistor which is connected between said first and second source terminals and which has a second gate and a second drain connected to the second gate;

an output portion which supplies a power supply having a third intermediate potential between the first intermediate potential and the second intermediate potential via an output terminal;

said output portion including;

a fifth MOS transistor which has a third drain connected to said first source terminal, a third source coupled to the output terminal, and a third gate coupled to the first signal terminal; and a sixth MOS transistor which has a fourth drain, a fourth source and a fourth gate wherein the fourth drain is connected to said second source terminal, the fourth source is coupled to the output terminal and the fourth gate is coupled to the second signal terminal.

7. A intermediate potential generating circuit, comprising:

an intermediate potential generating portion which generates first through n-th signals having first through n-th intermediate potentials different from each other between a first power source and a second power source;

said intermediate potential generating portion including a plurality of first MOS transistors which have conductive types identical to each other and which are connected in series between said first power source and said second power source and each of which has a first source, a first drain, a first gate and a first back gate wherein the first gate is connected to the first drain and the first back gate is connected to the first source;

a potential signal selecting portion which selects two signals from the first through n-th signals and which supplies a high potential side signal among the selected two signals as a first signal from a first signal terminal and a low potential side signal among the selected two signals as a second signal from a second signal terminal; and an output portion including;

an output terminal which produces a power supply having a third intermediate potential between a first intermediate potential corresponding to the first signal and a second intermediate potential corresponding to the second signal;

a second MOS transistor which has a second source, a second drain a second gate wherein the second drain is connected to said first power source, the second source is coupled to the output terminal and the second gate is connected to the first signal terminal;

a third MOS transistor which has a third source, a third drain and a third gate wherein the third drain is connected to said second power source, the third source is coupled to the output terminal and the third gate is connected to the second signal terminal.

8. A circuit as claimed in claim 7, wherein:

said first power source is positioned on a high potential side while said second power source is positioned on a low potential side, each of said first MOS transistors is of a P-channel type, and the first gate is connected to the first drain on the low potential side and the first source is connected to the high potential side.

9. A circuit as claimed in claim 7, wherein:

said first power source is positioned on a high potential side while said second power source is positioned on a low potential side, each of said first MOS transistors is of a N-channel type, and the first gate is connected to the first source on the low potential side and the first drain is connected to the high potential side.

10. A circuit as claimed in claim 7, wherein:

said potential signal selecting portion including;

a plurality of transfer gates each of which is structured by a first conductive type MOS transistor having a second gate and a second conductive type MOS transistor having a third gate;

an inverter which has an input terminal and an output terminal which are connected to the second gates and the third gates; and the two signals are selected from n of the intermediate potential signals inputted from said intermediate potential generating portion.

11. A circuit as claimed in claim 10, wherein:

said first conductive type MOS transistor is of an N-channel type and further includes a second back gate which is connected to said second power source, and said second conductive type MOS transistor is of a P-channel type and further includes a third back gate is connected to said first power source.

12. A circuit as claimed in claim 7, further comprising:

a capacitor which is connected between the output terminal and said second power source.

13. An intermediate potential generating circuit, comprising:

a first intermediate generating portion which generates n of signals having a first through n-th intermediate potentials which have potentials different to each other between a first power source and a second power source and supplies one signal among the first through n-th signals as a first signal from a first signal terminal;

said first intermediate generating portion including a plurality of first MOS transistors which are connected between said first power source and said second power source in series and each of which has a first gate, a first drain and a first back gate wherein the first gate is connected to the first drain coupled to the second power source side and the first back gate is connected to said first power source;

a second intermediate potential generating portion which generates n of signals having a first through n-th intermediate potentials which have potentials different to each other between said first power source and said second power source and supplies one signal among the n of signals as a second signal from a second signal terminal; and said first intermediate generating portion including a plurality of second MOS transistors which are connected between said first power source and said second power source in series and each of which has a second gate, a second drain and a second back gate wherein the second gate is connected to the second drain coupled to the first power source side and the second back gate is connected to said second power source;

an output portion including;

an output terminal which supplies a power supply having a third intermediate potential between a first intermediate potential corresponding to the first signal and a second intermediate potential corresponding to the second signal;

a third MOS transistor which has a third source, a third drain and a third gate wherein the third drain is connected to said first power source, the third source is coupled to the output terminal and the third gate is connected to the first signal terminal;

a fourth MOS transistor which has a fourth source, a fourth drain and a fourth gate wherein the fourth drain is connected to said second power source, the fourth source is coupled to the output terminal and a fourth gate is coupled to the second signal terminal.

14. A circuit as claimed in claim 13, wherein:

said first power source is positioned on a high potential side while said second power source is positioned on a low potential side, said first intermediate generating portion selects an intermediate signal and gives it to the first signal terminal such that the first signal terminal has a potential higher that of the second signal terminal among a plurality intimidate potential signals generated in said first intimidate generating portion.

15. A circuit as claimed in claim 13, further comprising:

a capacitor which is connected between the output terminal and said second power source.

16. An intermediate potential generating circuit, comprising:

a first intermediate generating portion which generates n of signals having a first through n-th intermediate potentials which have potentials different to each other between a first power source and a second power source;

said first intermediate generating portion including a plurality of first MOS transistors which are connected between said first power source and said second power source in series and which has a first gate, a first drain and a first back gate wherein the first gate is connected to the first drain coupled to the second power source side and the first back gate is connected to said first power source;

a second intermediate potential generating portion which generates n of signals having a first through n-th intermediate potentials which have potentials different to each other between said first power source and said second power source and supplies one signal among the n of signals as a second signal from a second signal terminal; and said first intermediate generating portion further including a plurality of second MOS transistors which are connected between said first power source and said second power source in series and each of which has a second gate, second drain and second back gate wherein the second gate is connected to the second drain coupled to the first power source side and the second back gate is connected to said second power source;

an output portion including;

an output terminal which supplies a power supply having a third intermediate potential between a first intermediate potential corresponding to the first signal and a second intermediate potential corresponding to the second signal;

a third MOS transistor has a third source, a third drain and a third gate wherein the third drain is connected to said first power source, the third source is coupled to the output terminal and the third gate is coupled to the first signal terminal;

a fourth MOS transistor which a fourth source, a fourth drain and a fourth gate wherein the fourth drain is connected to said second power source, the fourth source is coupled to the output terminal and the fourth gate is coupled to the second signal terminal.

17. A circuit as claimed in claim 16, further comprising;

a capacitor which is connected between the output terminal and said second power source.

* * * * *